Sept. 29, 1953 — N. ANTON — 2,653,800
ELECTRON TUBE HEAT-DISSIPATING RADIATOR
AND METHOD OF FABRICATING SAME
Filed Oct. 23, 1950
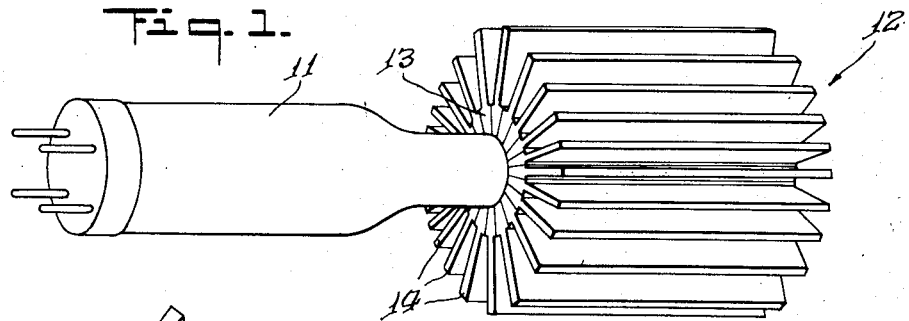
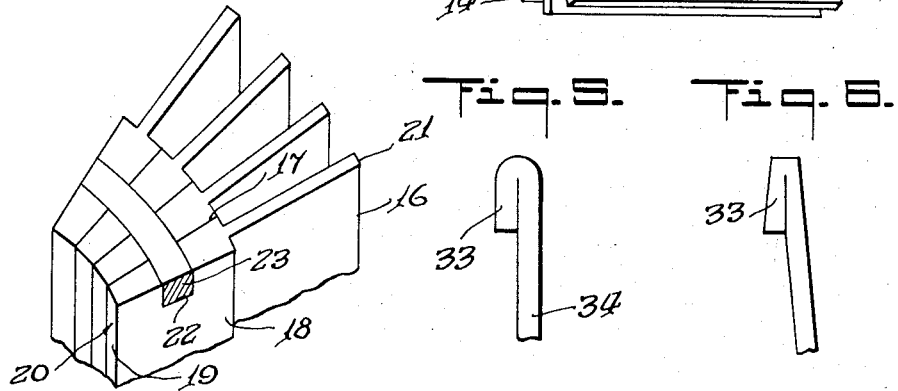
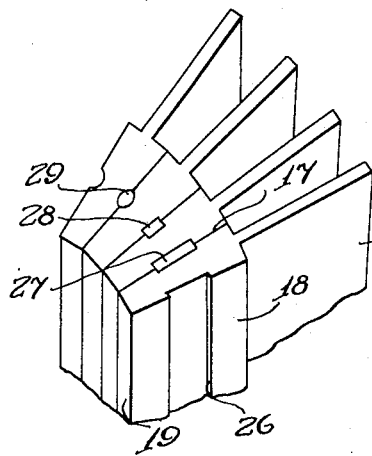
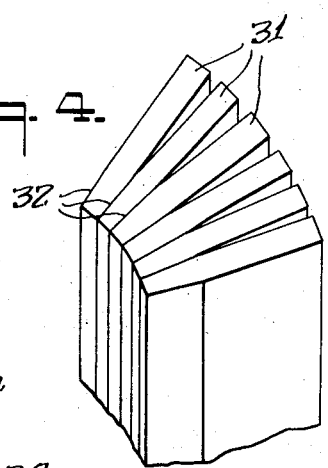
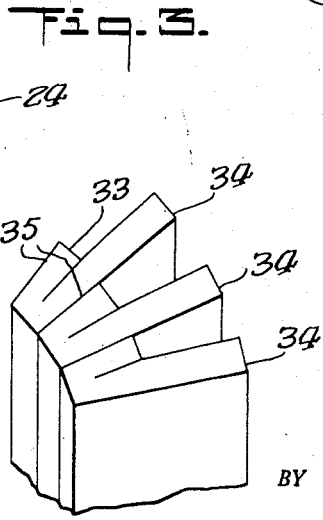
INVENTOR.
NICHOLAS ANTON
BY Darby & Darby
ATTORNEYS Patented Sept. 29, 1953

2,653,800

UNITED STATES PATENT OFFICE 2,653,800

ELECTRON TUBE HEAT-DISSIPATING RADIATOR AND METHOD OF FABRICATING SAME

Nicholas Anton, Brooklyn, N. Y.

Application October 23, 1950, Serial No. 191,582

9 Claims. (Cl. 257—261)

The present invention is directed towards the art including electron tube devices, and more particularly to the construction and fabrication of those portions of such devices which radiate or dissipate the unwanted heat customarily generated during their operation.

In all electron tubes, the electron stream has kinetic energy which is converted into heat energy upon the ultimate collection of these electrons, usually by the anode of the tube. In large, high power tubes the dissipation of the resultant heat energy constitutes a major problem and heat-dissipating radiators are usually provided, of a highly conductive metal with large surface area to form an efficient heat radiator.

As now customarily used, such radiators consist of a heavy walled core closed at one end and surrounding the anode of the tube. Fins are provided, usually protruding radially from the outer surface of the core. In assembly, the copper or iron anode of the tube is inserted into a bore in the core and soldered thereto by the use of various kinds of solder, such as lead and silver alloy, tin, cadmium or the like. Three chief methods are used at present to join the fins to the core. These are:

1. The core is wrapped with a silver solder sheet. The fins are then held tightly against the sheet by suitable means and the whole assembly is then heated or fired in a controlled gaseous atmosphere to a suitable temperature to produce soldering without oxidation.

2. The core is slotted and a silver solder ribbon is inserted into each slot. The fins are then forced into the slots and the core metal between the fins is hammered to establish mechanical contact between the fins and the sides of the slot. The whole assembly is then fired to fuse the solder and complete the soldering.

3. The fins are inserted into a jig forming a core mold. The whole assembly is then brought to a high temperature and molten copper is poured into the jig assembly, whereby the core is cast onto the fins. Thereafter, the core is bored to proper size.

Each of these prior art methods of assembly suffers from the disadvantage that special and often complicated means must be used to retain the fins in proper position relative to the core during the process of soldering or casting. In addition, the use of soldered or cast joints forms a discontinuity in the metal body of the radiator which impedes efficient heat transfer radially from the core to the fins, and this effect may increase with age due to oxidation or to electrical action at the junction of these dissimilar metals.

These factors have necessitated a factor of safety in the design of such radiators which have therefore been fairly large, bulky and weighty.

The present invention eliminates the need of joining the core to the fins, since in this case the core is formed by the fins themselves. In this way the fabrication of such heat radiators is greatly simplified and the necessary excellent contact between core and fins to assure good heat conduction is provided by the integral relation of core and fins. Furthermore, oxidation or decomposition of the joints between core and fins which occurred in some prior art forms of construction are thereby avoided.

These and other objects and advantages of the present invention will become more apparent from consideration of the following description, referring to the appended drawings, in which:

Figure 1 shows a perspective view of a complete electron tube device including a heat radiator according to the present invention;

Figure 2 shows a perspective fragmentary view of a portion of the radiator, illustrating one method of assembly;

Figure 3 is a similar perspective view illustrating another method of assembly;

Figure 4 is a fragmentary perspective view of another radiator with a modified form of fin element; and Figures 5, 6, and 7 are views of successive stages in still another form of fin element for a radiator according to the present invention.

Referring to the drawing, in Figure 1 there is shown an electron tube 11, which may be of the linear or radial electron flow as desired, having at the right end thereof, as viewed in the figure, an anode serving to collect electrons and to convert their kinetic energy into heat energy. Surrounding the anode (which is not visible in the figure) is a metallic core and fin radiator arrangement 12 which conducts the heat away from the central anode and, by virtue of its large area, radiates this heat to the surroundings. The radiator 12 is formed with a core 13 closely encircling the anode, and a plurality of flat fins 14 extending radially outward from the axis of the core 13 and anode. The present invention is especially concerned with improved forms of such radiator and methods of fabricating the same.

One such form is shown in Figure 2 where the radiator arrangement 12 of Figure 1 is made up of a plurality of similar integral elements 16, each of which has a core segment 20 and a fin 21. The core segment 20 has a pair of converging plane faces indicated at 17 and 18, connected at one end by a curved face 19 formed as a portion of a cylindrical surface having its center at the axis of convergence of faces 17 and 18. From the outer end of core segment 20 there extends a flat rib or fin 21, thinner than the width of the core segment 20 between the faces 17 and 18. Each of the elements 16 can readily be fabricated to the desired shape by forging, casting or machining or by other similar methods. It will be appreciated that, by juxtaposing or stacking a plurality of such elements 16, the curved faces 19 combine to form a circular bore, and the core segments 20 build up the solid core 13, while the fins 21 extend radially therefrom.

According to another feature of the present invention, each of the core segments 20 contains or is formed with an arcuate recess 22 extending between its converging faces 17 and 18 and preferably concentric with the curved face 19, so that upon stacking a plurality of such elements 16 in a circular array, the curved recesses 22 join to form a complete annular recess concentric with the axis of the arrangement of elements 16. A holding ring 23 may then be secured within the annular recess 22, as by brazing, soldering or the like, and will thereby rigidly hold the elements 16 in proper position to form the complete radiator. The bore then formed by the curved surfaces 19 is, of course, designed to accommodate the anode of the tube, which may be soldered or brazed thereto for good heat conduction. A similar holding ring (not shown) may be used at the other axial end of the radiator arrangement to provide further rigidity for the completed radiator assembly.

It will be noted that this arrangement is especially adapted for excellent heat radiation, since in devices of this type, the direction of heat flow in the radiator is essentially radial. In this direction, the present invention interposes no joints or other barrier to the flow of heat, since each of the elements 16 is integral from its innermost surface at 19 to its outermost edge.

Figure 3 shows a series of similar elements 24 with still another method of joining them into the completed core and fin assembly. In this instance no groove 22 or retaining ring 23 is utilized. Instead of this, each of the converging faces 17 and 18 of each element 24 is provided with an axially extending groove or recess 26. The juxtaposed recesses 26 of two adjoining elements 24 then provides an axially extending opening 27 running the length of the core assembly. In Figure 3 various shapes of such aperture formed by various shapes of recess 26 are shown at 27, 28 and 29. It will be understood that, normally, the same shape and size of grooved recess 27, 28 or 29 will be used throughout, these different forms being here shown merely for illustrative purposes.

Suitable conformingly shaped elements of brazing brass may then be inserted in these axial openings 27, 28 or 29, while the total assembly of elements 24 forming the complete radiator 12 is held or clamped in a suitable jig or fixture. Thereafter, the entire apparatus may be inserted into a firing furnace to melt the brazing brass which then rigidly joins all of the elements 24 into a single cohesive radiator assembly. Following the fabrication of the completed unit, the interior bore formed by the curved faces 19 may be suitably turned ground or burnished to fit the anode and to form a good soldered joint therewith.

Figure 4 illustrates a method of forming the individual elements such as 16 or 24 in a different form, which elements then may be assembled according to the method of either Figure 2 or Figure 3. As shown in this figure, flat or plate-like fin elements 31 are coined or forged at one end to form tapered sides 32 converging toward the desired center axis of the radiator assembly. When stacked with tapered faces juxtaposed, again a circular radial array of fins 31 is provided which can be assembled into a rigid radiator unit in either of the ways shown in Figure 2 or 3. It will be seen that here the tapered faces 32 correspond to faces 17 and 18 of Figures 2 and 3, and the fin is of the same thickness as the core element.

Figures 5, 6 and 7 illustrate a further method of forming the individual radiator elements. The first step in this fabrication is shown in Figure 6, where the end 33 of a flat or plate-like fin element 34 is bent back upon the main body of the fin 34. As a second step, the folded back end 33 is forged or coined to have flat converging sides which, when stacked together as shown in Figure 8, produces another circular array of fins extending radially from a central axis. Again, these elements may be securely fastened together in the manner shown in either Figure 2 or Figure 3.

Accordingly, there has been described above a number of different types of radiator fin elements which may be joined together to form a radiator assembly in either of the ways described. In each instance, the radiator element has a portion serving as a part of the core and another portion serving as a radiating fin, whereby the uncertain heat conduction usually experienced across the joint between fin and core is eliminated. By these methods, also, it is possible to use materials such as aluminum, which are difficult to solder and for which higher safety factors have had to be allowed in the design of old type radiators. In this way, 100% of the purchased material can be fully utilized, and labor costs are reduced since all steps of fabrication can be performed by production type processes.

It will be understood that the above description is illustrative only, and is not to be considered in a limiting sense, the present invention being defined solely by the appended claims.

It will be understood that where the central bore of the radiator assembly is to extend only partially therethrough, the elements may be formed with the converging faces 17, 18 or 32 or 35 meeting completely over a portion of the axial extent of the elements. In such a case, the elements converge together at the central axis for such portion. For the remainder of the axial length of the elements, the converging faces end in a surface such as 19 to form the desired partial bore.

When desired, the fins may be made by other methods, such as extrusion.

It is also understood that by changing the angle of the converging faces different shaped bores can be readily attained. The cross-section of the bore can thus be made to be instead of round, square, oblong, elliptical, etc. By making the faces of the core part of the fin parallel, in-line radiators can also be achieved.

What is claimed is:

1. An electron tube comprising a unitary heat-dissipating radiator comprising a heat-conducting core structure with a central bore, and a plurality of heat-conducting plane fins in planes intersecting the axis of said bore, said core structure being formed of a plurality of core segments each having a curved inner surface forming a portion of said bore, with the totality of said inner surfaces forming the entire bore, and each having a pair of converging plane faces, means maintaining each of said plane faces in contact throughout its entire extent with a similar plane face of an adjoining core segment, whereby said core structure is a solid bored structure built up solely of said segments, each of said plurality of fins being integral with a respective core segment to facilitate conduction of heat to said fins, and a cylindrical anode seated within said bore and soft-soldered to said core.

2. An electron tube as in claim 1 wherein each of said core segments has a recess at one end thereof, said recesses being in circular alignment in said plurality of segments to form an annular groove, said contact-maintaining means consisting of a holding ring secured in said annular groove for holding said elements together.

3. An electron tube as in claim 1, wherein said contact-maintaining means extend transversely of said core segments.

4. An electron tube as in claim 1, wherein said contact-maintaining means extend axially along said core segments.

5. An electron tube as in claim 1, wherein each of said integral fin and core segment arrangements is formed as a flat plate having parallel faces forming the fin and tapering faces forming the core segment.

6. An electron tube as in claim 1, wherein each of said integral fin and core segment arrangements is formed by a flat plate having parallel faces at one end forming the fin thereof and folded at the other end and formed with converging plane faces at said other end to form the core segment thereof.

7. An electron tube as in claim 1, wherein each of said fin and core segment arrangements has a flat portion with parallel sides forming the fin, the core segment having a transverse dimension greater than that of said fin.

8. The method of fabricating an electron tube comprising the steps of tapering the flat faces of each of a plurality of integral fin plates at one end to a point short of a juncture of said tapered faces, joining said plates in a unitary arrangement with each in a plane extending radially from a central axis with said tapered faces in contiguity throughout their surfaces, whereby the end edges of said plates form a substantially central bore, forming a vacuum envelope with a cylindrical anode as a part thereof, and thereafter soft-soldering said anode within said bore.

9. The method of forming a radiator for electron tubes or the like, comprising the steps of folding each of a plurality of flat heat conductive plates at one end, forming converging faces on each said folded end, and securing said plates in a unitary array with each plate in a plane including a common central axis and with said converging faces juxtaposed.

NICHOLAS ANTON.

References Cited in the file of this patent

UNITED STATES PATENTS

| Number | Name | Date |
|---|---|---|
| 2,267,128 | Mouromtseff et al. | Dec. 23, 1941 |
| 2,434,676 | Spender | Jan. 20, 1948 |
| 2,477,122 | Garner | July 26, 1949 |
| 2,502,429 | Cole | Apr. 4, 1950 |

FOREIGN PATENTS

| Number | Country | Date |
|---|---|---|
| 592,470 | Great Britain | Sept. 18, 1947 |